(12) United States Patent
Roh

(10) Patent No.: US 9,348,171 B2
(45) Date of Patent: May 24, 2016

(54) LIQUID CRYSTAL DISPLAY DEVICE AND METHOD OF FABRICATING THE SAME

(71) Applicant: LG DISPLAY CO, LTD., Seoul (KR)

(72) Inventor: Su-Dong Roh, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/738,238

(22) Filed: Jun. 12, 2015

(65) Prior Publication Data

US 2015/0309363 A1  Oct. 29, 2015

Related U.S. Application Data

(62) Division of application No. 11/315,301, filed on Dec. 23, 2005, now Pat. No. 9,086,599.

(30) Foreign Application Priority Data

Mar. 31, 2005 (KR) .................. 10-2005-0027063

(51) Int. Cl.
*G02F 1/1339* (2006.01)
*G02F 1/1333* (2006.01)
*G02F 1/1335* (2006.01)
(Continued)

(52) U.S. Cl.
CPC ...... *G02F 1/133516* (2013.01); *G02F 1/13394* (2013.01); *G02F 1/133512* (2013.01); *G02F 1/133707* (2013.01); *G02F 1/134309* (2013.01); *G02F 1/136209* (2013.01); *G02F 1/1393* (2013.01); *G02F 1/133509* (2013.01); *G02F 2001/13396* (2013.01); *G02F 2201/122* (2013.01)

(58) Field of Classification Search
USPC ........................................... 349/157
See application file for complete search history.

(56) References Cited

U.S. PATENT DOCUMENTS 6,091,466 A   7/2000 Kim et al.
6,671,025 B1  12/2003 Ikeda et al.
(Continued)

FOREIGN PATENT DOCUMENTS

CN   1573489 A    2/2005
KR   1999-0006951  1/1999
(Continued)

OTHER PUBLICATIONS

Search Report issued Sep. 29, 2009 in corresponding Taiwanese Application No. 094147245.
(Continued)

*Primary Examiner* — Wen-Ying P Chen
(74) *Attorney, Agent, or Firm* — Morgan, Lewis & Bockius LLP

(57) ABSTRACT

A liquid crystal display device includes first and second substrates spaced apart from and facing each other, gate and data lines on an inner surface of the first substrate and crossing each other to define a pixel region, a thin film transistor adjacent to the crossing of the gate and data lines, a pixel electrode in the pixel region and including a plurality of slits, an island pattern over the gate line, a black matrix on an inner surface of the second substrate, the black matrix corresponding to the gate line, a color filter layer on the black matrix, a common electrode on the color filter layer, a plurality of ribs on the common electrode corresponding to the pixel electrode; and a spacer on the common electrode corresponding to the black matrix.

9 Claims, 20 Drawing Sheets

(51) Int. Cl.
*G02F 1/1337* (2006.01)
*G02F 1/1362* (2006.01)
*G02F 1/1343* (2006.01)
G02F 1/139 (2006.01)

(56) References Cited

U.S. PATENT DOCUMENTS

| | | | |
|---|---|---|---|
| 6,917,394 | B2 | 7/2005 | Song et al. |
| 6,972,822 | B2 | 12/2005 | Miyashita |
| 7,474,292 | B2 | 1/2009 | Kamada et al. |
| 2001/0026347 | A1* | 10/2001 | Sawasaki .......... G02F 1/133707 349/156 |
| 2002/0033927 | A1* | 3/2002 | Mun ................. G02F 1/133707 349/156 |
| 2002/0047948 | A1 | 4/2002 | Yoo et al. |
| 2002/0093615 | A1 | 7/2002 | Mun et al. |
| 2002/0109799 | A1 | 8/2002 | Choi et al. |
| 2002/0149728 | A1 | 10/2002 | Ogishima et al. |
| 2003/0122127 | A1 | 7/2003 | Yonekura et al. |
| 2004/0075798 | A1 | 4/2004 | Inoue et al. |
| 2004/0095538 | A1 | 5/2004 | Kim et al. |
| 2004/0119897 | A1 | 6/2004 | Jang et al. |
| 2004/0189928 | A1 | 9/2004 | Yang et al. |
| 2005/0117078 | A1 | 6/2005 | Lai et al. |
| 2005/0140887 | A1 | 6/2005 | Song et al. |

FOREIGN PATENT DOCUMENTS

| | | |
|---|---|---|
| KR | 2001-0082507 | 8/2001 |
| TW | 200407951 A | 12/2009 |

OTHER PUBLICATIONS

Y. Taniguchi et al., An Ultra-High Quality MVA-LCD Using a New Multi-Layer CF Resing Spacer and Black-MatriX, SID 00 Digest, (2000), pp. 378-381.

Yoshio Koike et al., Super High Quality MVA-TFT Liquid Crystal Displays, Fujitsu Sci. Tech. J., vol. 35, No. 2, (Dec. 1999), pp. 221-228.

* cited by examiner

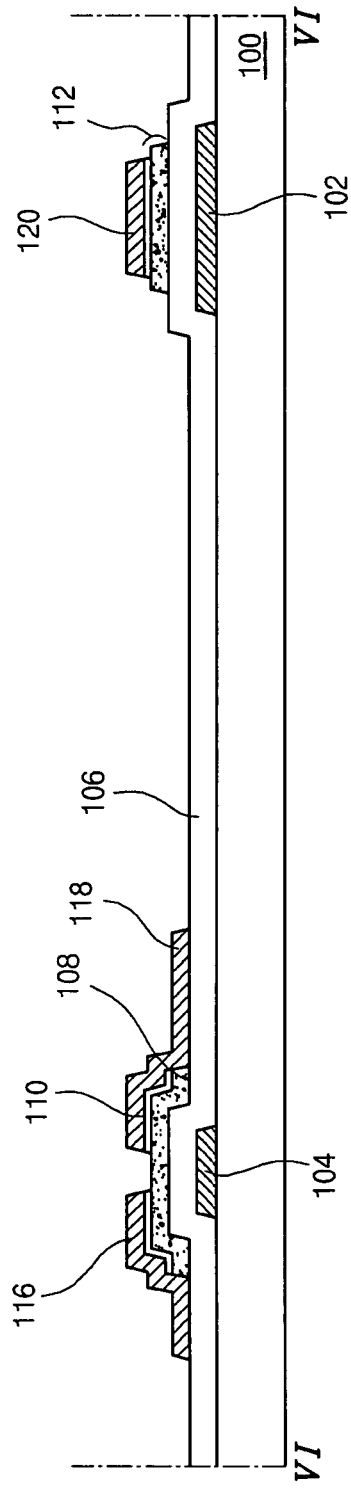
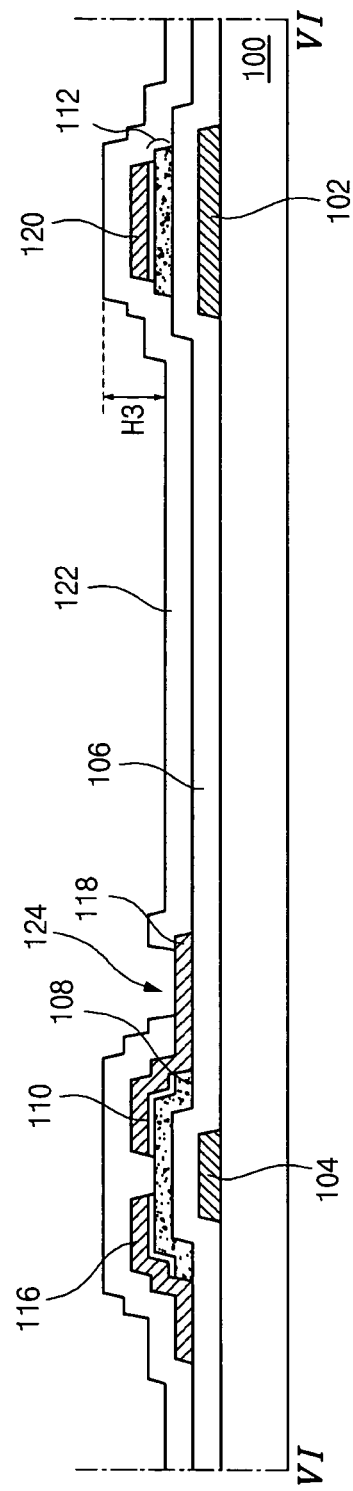

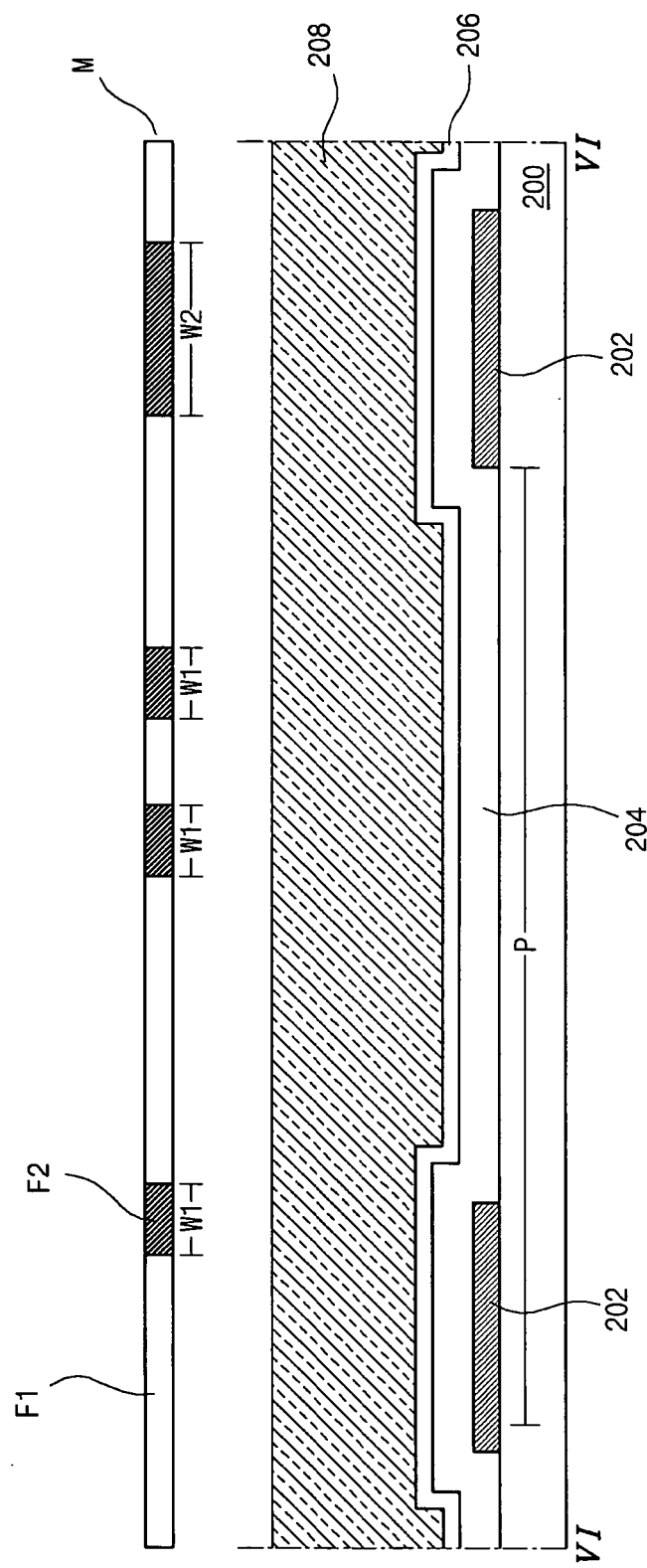

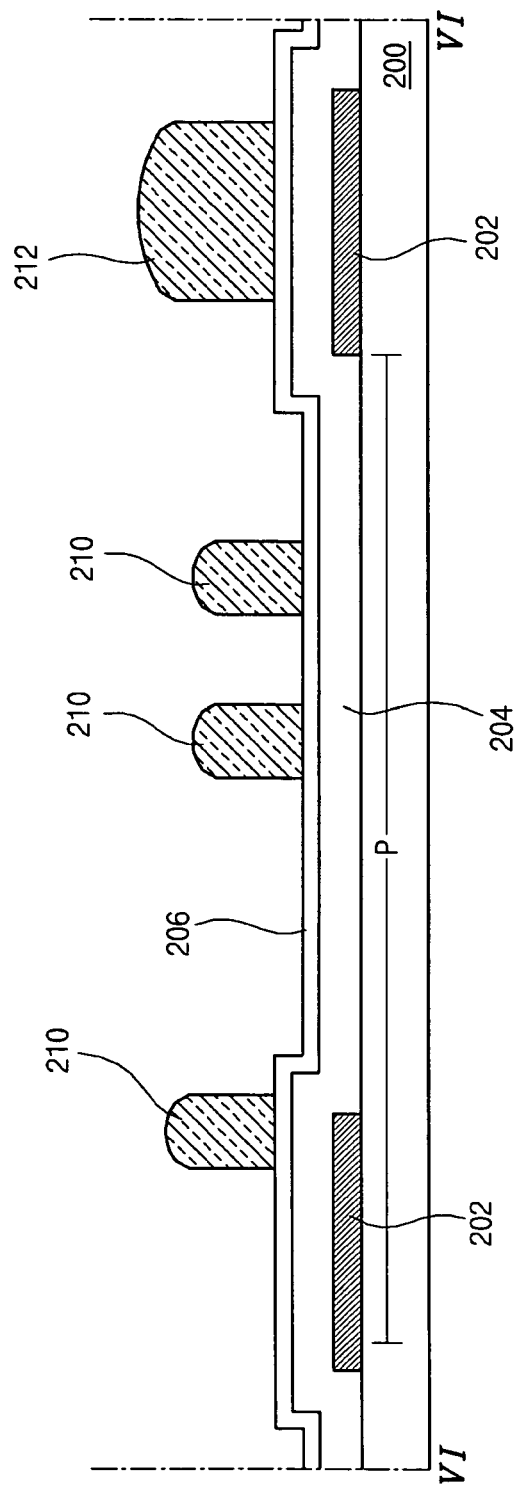

LIQUID CRYSTAL DISPLAY DEVICE AND METHOD OF FABRICATING THE SAME

This application is a divisional of co-pending U.S. patent application Ser. No. 11/315,301, filed Dec. 23, 2005, which claims the benefit of Korean Patent Application No. 10-2005-0027063, filed Mar. 31, 2005, which are hereby incorporated by reference in their entirety.

BACKGROUND OF THE INVENTION

1. Field of the Invention

The present invention relates to a display device, and more particularly, to a liquid crystal display device and a method of fabricating the same.

2. Discussion of the Related Art

Liquid crystal display (LCD) devices are driven so as to use the optical anisotropy and polarization characteristics of a liquid crystal material. More particularly, liquid crystal molecules have a definite alignment as a result of their long, thin shapes and are arranged to have initial pre-tilt angles. The alignment direction can be controlled by applying an electric field. Accordingly, variations in an applied electric field influence the alignment of the liquid crystal molecules. Due to optical anisotropy of the liquid crystal molecules, the refraction of incident light depends on the alignment direction of the liquid crystal molecules. Thus, by properly controlling the applied electric field, an image that has a desired brightness can be produced.

FIG. 1A is a perspective view schematically illustrating a related art LCD device, and FIG. 1B is an enlarged view of a thin film transistor T in FIG. 1A. As shown in FIGS. 1A and 1B, the LCD device 51 includes a first substrate 22 and a second substrate 5, which are spaced apart from each other, and a liquid crystal layer 11 (not shown) interposed between the first substrate 22 and second substrate 5. A black matrix 6, a color filter layer 7, and a common electrode 9 are formed on an interior surface of the second substrate 5, which faces the first substrate 22. The color filter layer 7 includes red, green and blue color filters 7a, 7b and 7c, each of which is disposed in an opening of the black matrix 6. The common electrode 9 is transparent and covers the black matrix 6 and the color filters 7a, 7b and 7c.

A plurality of pixel regions P are defined on an interior surface of the first substrate 22, which faces the second substrate 5. A plurality of gate lines 12 and a plurality of data lines 24 cross each other to define the plurality of pixel regions P. A thin film transistor T is formed adjacent to where the gate and data lines 12 and 24 cross each other. The thin film transistor T includes a gate electrode 30, an active layer 32, a source electrode 34, and a drain electrode 36. The active layer 32 overlaps the gate electrode 32, and the source and drain electrodes 34 and 36 are spaced apart from each other and positioned over the active layer 32. A pixel electrode 17 is formed in each pixel region P and is connected to the drain electrode 36 of the thin film transistor T in each pixel region P. The pixel electrode 17 includes a transparent conductive material having high transmittance, such as indium-tin-oxide (ITO) or indium-zinc-oxide (IZO). The thin film transistor T and the pixel electrode 17 of each pixel are arranged in a matrix form. Pulse signals are provided to the gate electrode 30 through the gate line 12, and data signals are provided to the source electrode 34 through the data line 24.

The second substrate 5 including the black matrix 6, the color filter layer 7 and the common electrode 9 is often referred to as a color filter substrate. The first substrate 22 including the gate lines 12, the data lines 24, the thin film transistors T and the pixel electrodes 17 is often referred to as an array substrate.

In the above related art LCD device, various approaches have been researched for achieving wide viewing angles and high brightness. A multi-domain method, a phase compensation method, an in-plane switching (IPS) mode, a vertical alignment (VA) mode, and so on have been researched and developed as methods for achieving wide viewing angles. In the multi-domain method, a pixel is divided into several regions, in which each of the liquid crystal molecules are differently arranged so that each pixel has overall average properties. In the phase compensation method, a phase difference film, which is often referred to as a retardation film, is used to reduce changes in phase difference depending on viewing angles. In the IPS mode, liquid crystal molecules move in a plane substantially parallel to the substrates corresponding to an electric field produced in parallel to the substrate of the LCD device. In the VA mode, liquid crystal molecules having negative dielectric anisotropy are arranged vertically with respect to the substrate when voltage is not applied.

Among the above methods, the VA mode has the additional advantage of fast response time as compared to the twisted nematic (TN) mode, which is widely used in conventional LCD devices. The VA mode has a response time of about 30 ms as compared with the 50 ms of the TN mode, when the transmittance of the LCD device changes from 100% to 50%. Generally, in the VA mode, a vertical alignment material, a liquid crystal material with negative dielectric anisotropy and a negative retardation film are used. Thus, the VA mode has a wide viewing angle, and has a high contrast ratio.

FIG. 2 is a cross-section view illustrating a pixel region of a VA mode LCD device according to the related art. As shown in FIG. 2, a pixel electrode 17 is formed on an interior surface of a first substrate 22, and a black matrix 6, a color filter layer 7 and a common electrode 9 are subsequently formed on an interior surface of a second substrate 5, which is spaced apart from and facing the first substrate 22. A liquid crystal layer 11 is interposed between the first and second substrates 22 and 5. The liquid crystal layer 11 has a negative dielectric anisotropy, and liquid crystal molecules of the liquid crystal layer 11 may be vertically arranged between the first and second substrates 22 and 5.

When a voltage is applied to the pixel electrode 17 and the common electrode 9, an electric field E substantially perpendicular to the substrates 5 and 22 is induced between the pixel electrode 17 and the common electrode 9, and the liquid crystal molecules of the liquid crystal layer 11 are realigned so as to be perpendicular with respect to the direction of the electric field E. At this time, the pixel electrode 17 is partially patterned and has slits S (or holes), and the electric field E is distorted due to the slits S. Thus, multi-domains are formed in one pixel region. Further, a rib is formed on the common electrode 9 at a center portion between the slits S of the pixel electrode 17, and the pixel region may be symmetrically divided so as to have mirrored patterns or the same patterns at upper and lower parts of the pixel electrode 17. Meanwhile, a spacer SP is further formed on the common electrode 9 to maintain a cell gap between the first and second substrates 22 and 5.

FIGS. 3A to 3D are cross-sectional views illustrating a manufacturing method of a color filter substrate for a related art VA mode LCD. As shown in FIG. 3A, a black matrix 6 is formed on a transparent substrate 5 by coating a black resin and then patterning the black resin through a first mask process, or by depositing either chromium (Cr) or chromium oxide ($CrO_x$) and then patterning one of the chromium layers through a first mask process. The black matrix 6 may be in a variety of shapes depending on the structure of an array substrate (not shown). However, the black matrix typically has a lattice shape.

As shown in FIG. 3B, a color filter layer 7 is formed on the substrate 5, including the black matrix 6. The color filter layer 7 includes red, green and blue color filters. The color filter layer 7 may be formed through one of various methods. A pigment dispersion method is widely used for forming the color filter layer 7. In the pigment dispersion method, each color filter can be formed by coating a pigment resin across a surface of the transparent substrate 5 and then patterning the pigment resin through a mask process. Accordingly, the color filter layer 7 having three colors can be formed through a three mask process, such as second, third and fourth mask processes.

As shown in FIG. 3C, a common electrode 9 is formed across the surface of the substrate 5, including the color filter layer 7. Subsequently, a rib R is formed on the common electrode 9 by coating a resin and then patterning the resin through a fifth mask process. As shown in FIG. 3D, a spacer SP having a columnar shape is formed on the substrate 5 by coating a polymer resin and then patterning the polymer resin through a sixth mask process. The spacer SP corresponds to the black matrix 6. The color filter substrate for the VA mode LCD device, including the spacer SP and the rib R, is manufactured using six mask processes. Thus, the color filter substrate for this related art VA mode LCD device has two additional mask processes for the rib and the spacer as compared to a color filter substrate for a related art TN mode LCD device, which is manufactured using four mask processes. Accordingly, manufacturing time and costs are higher for a VA mode LCD, and thus productivity is lower.

To improve productivity, a process for simultaneously forming the rib and the spacer has been proposed. FIGS. 4A to 4C are cross-sectional views illustrating a manufacturing method of another color filter substrate for another related art VA mode LCD device. As shown in FIG. 4A, a black matrix 52 is formed on a transparent substrate 50, on which pixel regions P are defined, by coating a black resin and then patterning the black resin through a first mask process.

As shown in FIG. 4B, a color filter layer is formed on the substrate 50, including the black matrix 52. The color filter layer includes red 54a, green 54b and blue (not shown) color filters. The red, green and blue color filters can be formed through second, third and fourth mask processes, respectively. This masking process yields color filters that overlap each other. For example, the red and green color filters 54a and 54b, are sequentially formed such that they both overlap the black matrix 50 and the green color filter 54b overlaps the red color filter 54a. A subsequent blue color filter (not shown) would overlap the black matrix 50 and both of the red and green color filters 54a and 54b. Accordingly, the combined thickness of the black matrix 52, the red color filter 54a and the green color filter 54b is thicker than a thickness of each of the color filters in the pixel regions P.

As shown in FIG. 4C, a common electrode 56 is formed across a surface of the substrate 50, including the color filter layer. A first rib R1 and a second rib R2 are formed on the common electrode 56 by coating a resin and then patterning it through a fifth mask process. The first rib R1 is disposed over where the green color filter 54b, the red color filter 54a, and the black matrix 52 are sequentially overlapped, and the second rib R2 is disposed in each pixel region P. The first rib R1 together with the overlapped color filters 54a and 54b functions as a spacer, and the second rib R2 is used to form multi domains in one pixel region. A total thickness H of the first rib R1 and the overlapped color filters 54a and 54b may be about 4 μm. Accordingly, a color filter substrate may be manufactured through a five mask process, which is less than the six mask manufacturing processes for a color filter substrate shown in FIGS. 3A to 3D. However, the common electrode 56 in the five mask color filter substrate may be disconnected due to a step coverage (or difference) created by the overlapping color filters on the black matrix.

SUMMARY OF THE INVENTION

Accordingly, the present invention is directed to a liquid crystal display device and a method of fabricating the same that substantially obviate one or more of problems due to limitations and disadvantages of the related art.

An object of the present invention is to provide a liquid crystal display device having a wide viewing angle.

Another object of the present invention is to provide a method of fabricating a liquid crystal display device having a simplified process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates spaced apart from and facing each other, gate and data lines on an inner surface of the first substrate and crossing each other to define a pixel region, a thin film transistor adjacent to the crossing of the gate and data lines, a pixel electrode in the pixel region and including a plurality of slits, an island pattern over the gate line, a black matrix on an inner surface of the second substrate, the black matrix corresponding to the gate line, a color filter layer on the black matrix, a common electrode on the color filter layer, a plurality of ribs on the common electrode corresponding to the pixel electrode, and a spacer on the common electrode corresponding to the black matrix.

In another aspect, a manufacturing method of an array substrate for a liquid crystal display device includes forming a gate line on a substrate, forming a data line crossing the gate line to define a pixel region, forming a thin film transistor at a crossing portion of the gate and data lines, forming an island pattern over the gate line, forming a passivation layer on the island pattern; and forming a pixel electrode in the pixel region, the pixel electrode having a plurality of slits.

In another aspect, a manufacturing method of a color filter substrate for a liquid crystal display device includes forming a black matrix on a substrate including a pixel region, the black matrix corresponding to a border portion between adjacent pixel regions, forming a color filter layer on the black matrix, forming a common electrode on the color filter layer, forming a photosensitive layer on the common electrode, exposing the photosensitive layer to light through a mask, the mask including a transmitting portion and a blocking portion, forming first patterns and a second pattern by developing the exposed photosensitive layer, the first patterns corresponding to the pixel region, and the second pattern corresponding to the black matrix, wherein the second pattern is wider than the first patterns; and forming ribs and a spacer by heat-treating the first patterns and the second pattern.

In another aspect, a manufacturing method of a color filter substrate for a liquid crystal display device includes forming a black matrix on a substrate including a pixel region, the black matrix corresponding to a border portion between adjacent pixel regions, forming a color filter layer on the black matrix, forming a common electrode on the color filter layer, forming a photosensitive layer on the common electrode, exposing the photosensitive layer to light through a mask, the mask including a transmitting portion, a blocking portion, and a half-transmitting portion, forming first patterns and a second pattern by developing the exposed photosensitive layer, the first patterns corresponding to the pixel region, and the second pattern corresponding to the black matrix; and forming ribs and a spacer by heat-treating the first patterns and the second pattern.

In a further aspect, a manufacturing method of a liquid crystal display device includes forming a gate line on a first substrate, forming a data line on the first substrate, the data line crossing the gate line to define a pixel region, forming a thin film transistor adjacent to the crossing of the gate and data lines, forming an island pattern over the gate line, forming a pixel electrode in the pixel region, the pixel electrode having a plurality of slits, forming a black matrix on a second substrate, the black matrix corresponding to a border portion between adjacent pixel regions, forming a color filter layer on the black matrix, forming a common electrode on the color filter layer, forming ribs on the common electrode in the pixel region, forming a spacer on the common electrode corresponding the black matrix, and attaching the first and second substrates such that the spacer corresponds to the island pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 7A to 7D are cross-sectional views illustrating a manufacturing method of an array substrate for a VA mode LCD device according to an embodiment of the present invention;

FIGS. 8A to 8F are cross-sectional views illustrating a manufacturing method of a color filter substrate for a VA mode LCD device according to an embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1A:
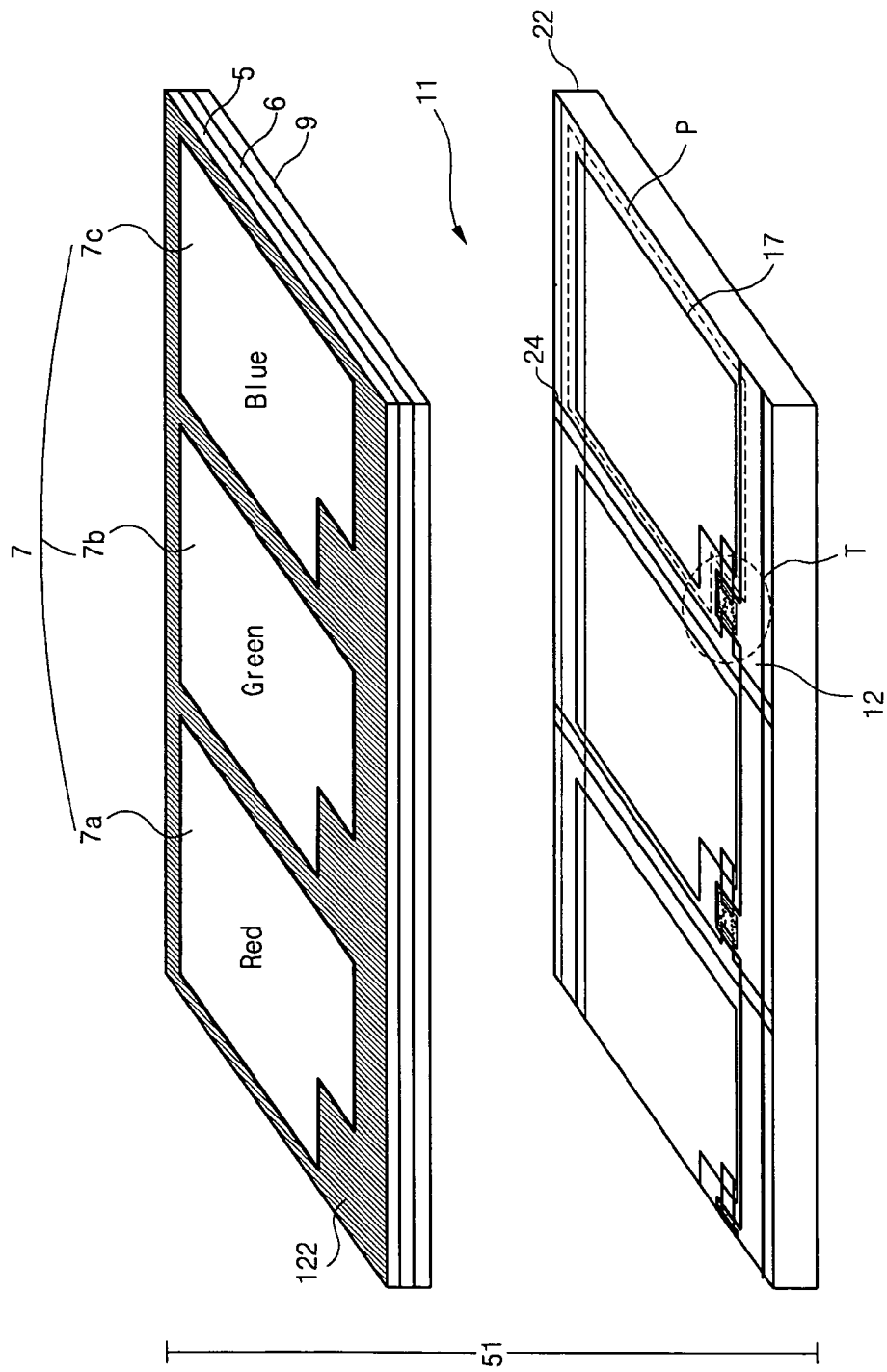
FIG. 1A is a perspective view schematically illustrating a related art LCD device.
Figure 1B:
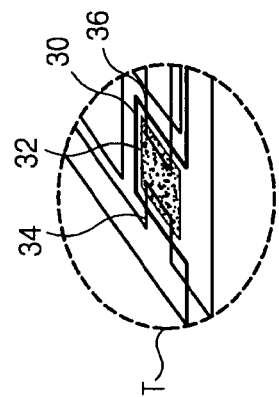
FIG. 1B is an enlarged view of a thin film transistor T in FIG. 1A.
Figure 2:
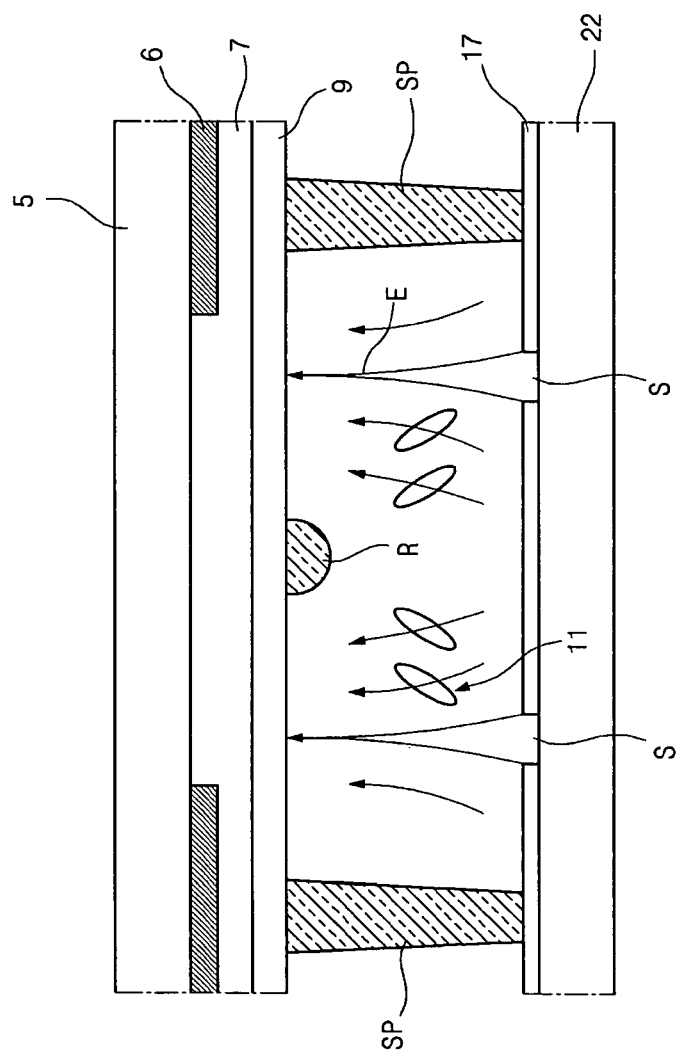
FIG. 2 is a cross-section view illustrating a pixel region of a related art VA mode LCD device.
Figure 3A:
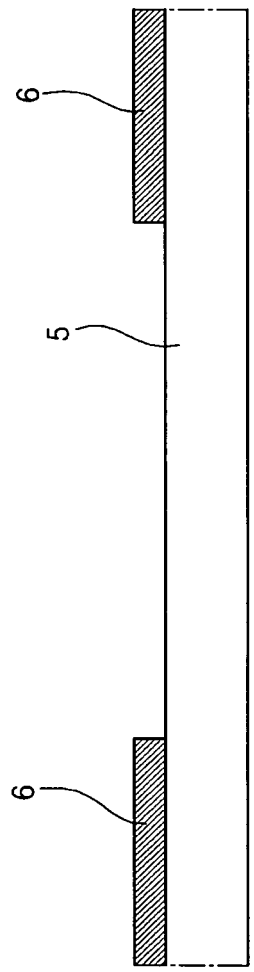
FIGS. 3A to 3D are cross-sectional views illustrating a manufacturing method of a related art color filter substrate for a VA mode LCD.
Figure 3B:
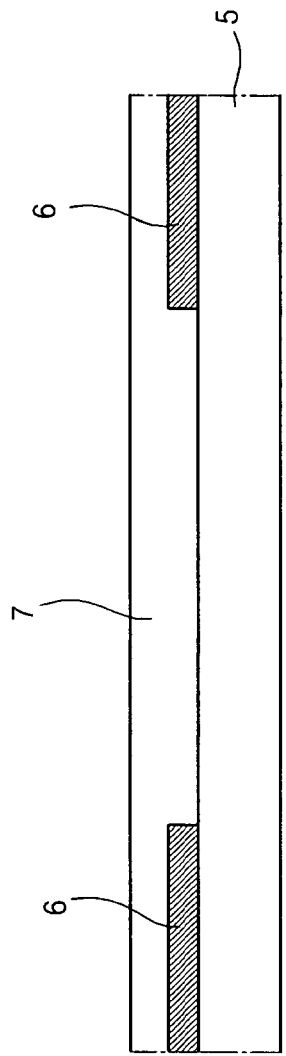
Figure 3C:
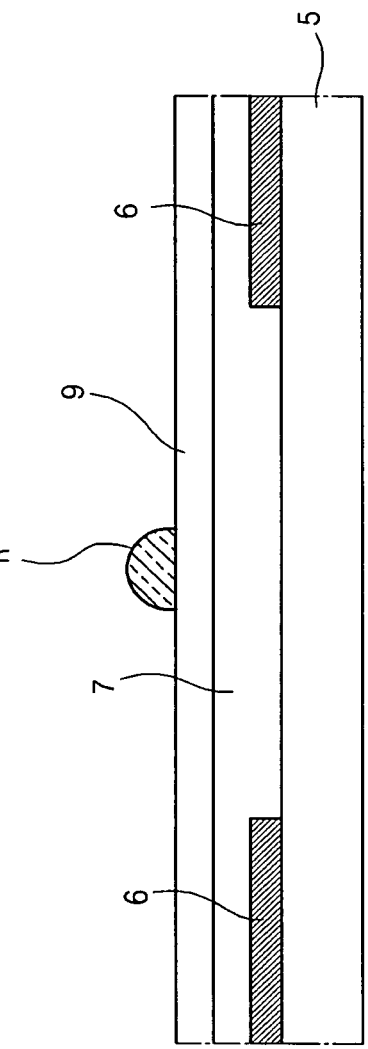
Figure 3D:
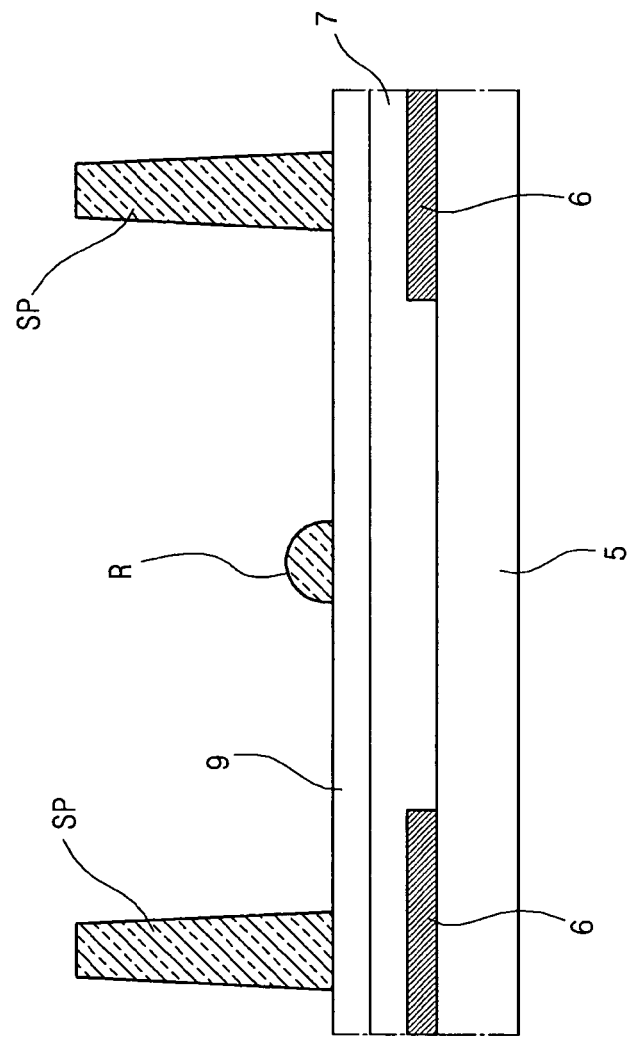
Figure 4A:
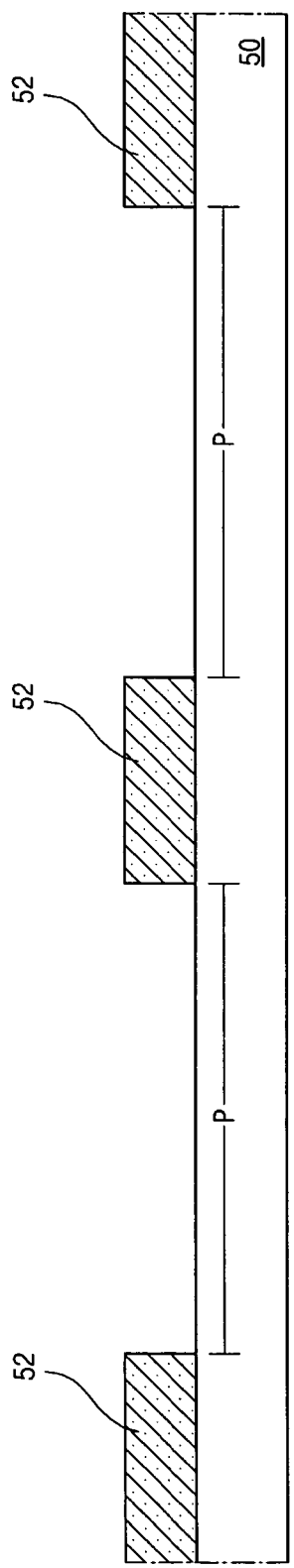
FIGS. 4A to 4C are cross-sectional views illustrating a manufacturing method of another related art color filter substrate for another related art VA mode LCD device.
Figure 4B:
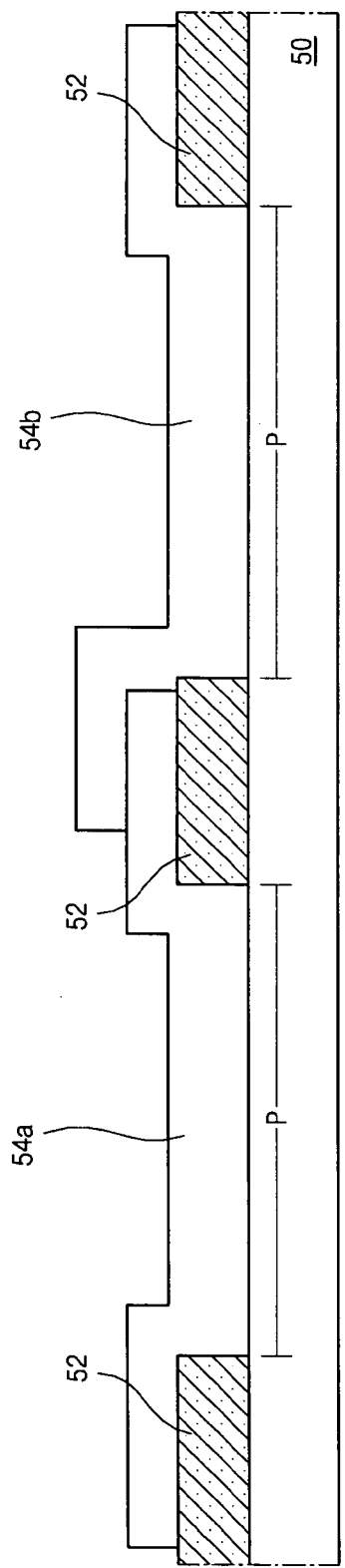
Figure 4C:
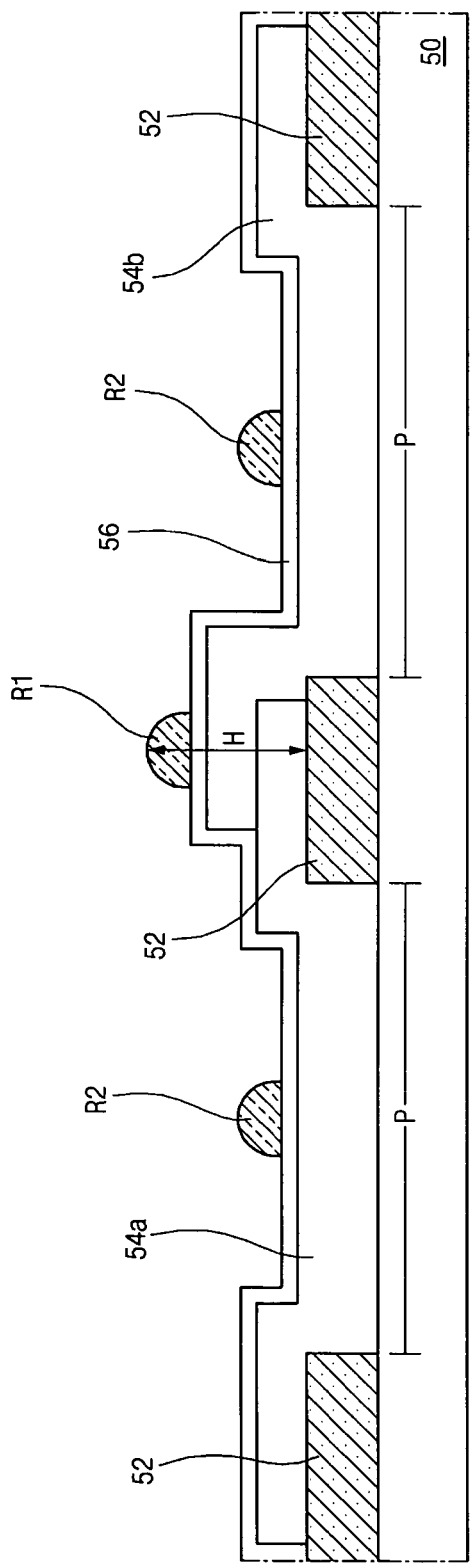
Figure 5:
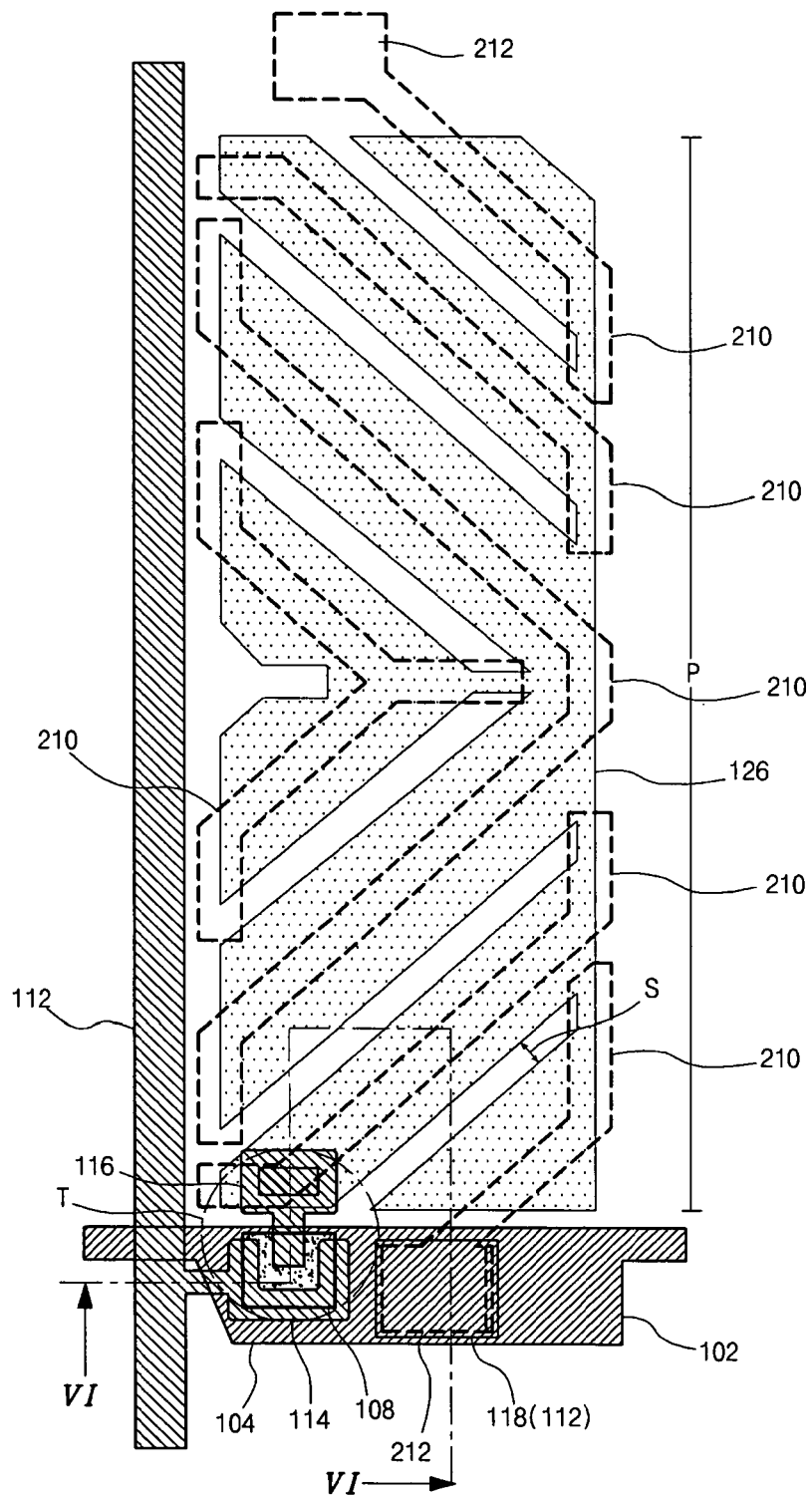
FIG. 5 is a view illustrating a pixel region of a VA mode LCD device according to an embodiment of the present invention.

FIG. 5 is a view illustrating a pixel region of a VA mode LCD device according to an embodiment of the present invention. As shown in FIG. 5, a gate line 102 is formed along a first direction, and a data line 114 is formed along a second direction crossing the first direction. The gate line 102 and the data line 114 cross each other to define a pixel region P.

A thin film transistor T is formed adjacent to each crossing of the gate and data lines 102 and 114. The thin film transistor T includes a gate electrode 104 that is connected to the gate line 102, an active layer 108 that is disposed over the gate electrode 104, a source electrode 116 that is connected to the data line 114, and a drain electrode 118 that is spaced apart from a source electrode 116 over the active layer 108. The thin film transistor T further includes an ohmic contact layer (not shown) between the active layer 108 and the source electrode 116 and between the active layer 108 and the drain electrode 118.

A pixel electrode 126 is formed in the pixel region P and is connected to the drain electrode 118. The pixel electrode 126 includes a plurality of slits S. The slits S of an upper area of the pixel region P in the context of FIG. 5 are formed to angle down from a left side to a right side, and the slits S of a lower area of the pixel region P in the context of FIG. 5 are formed to angle up from the left side to the right side. Thus, the slits S in the pixel region P appear to substantially form portions of the pixel electrode into "V-shapes" that are left-handedly rotated by a right angle with respect to the gate line 102.

Ribs 210 and spacers 212 are formed on a color filter substrate (not shown) spaced apart from the substrate including the thin film transistor T and the pixel electrode 126. The ribs 210 and the spacers 212 are simultaneously formed. The ribs 210 are formed to correspond to portions of the pixel between adjacent slits S, and the spacers 212 are formed to correspond to the gate line 102. Moreover, a semiconductor pattern 112 and a metal pattern 120 having an island shape are formed over the gate line 102 corresponding to each spacer 212 to form a high step.

Figure 6:
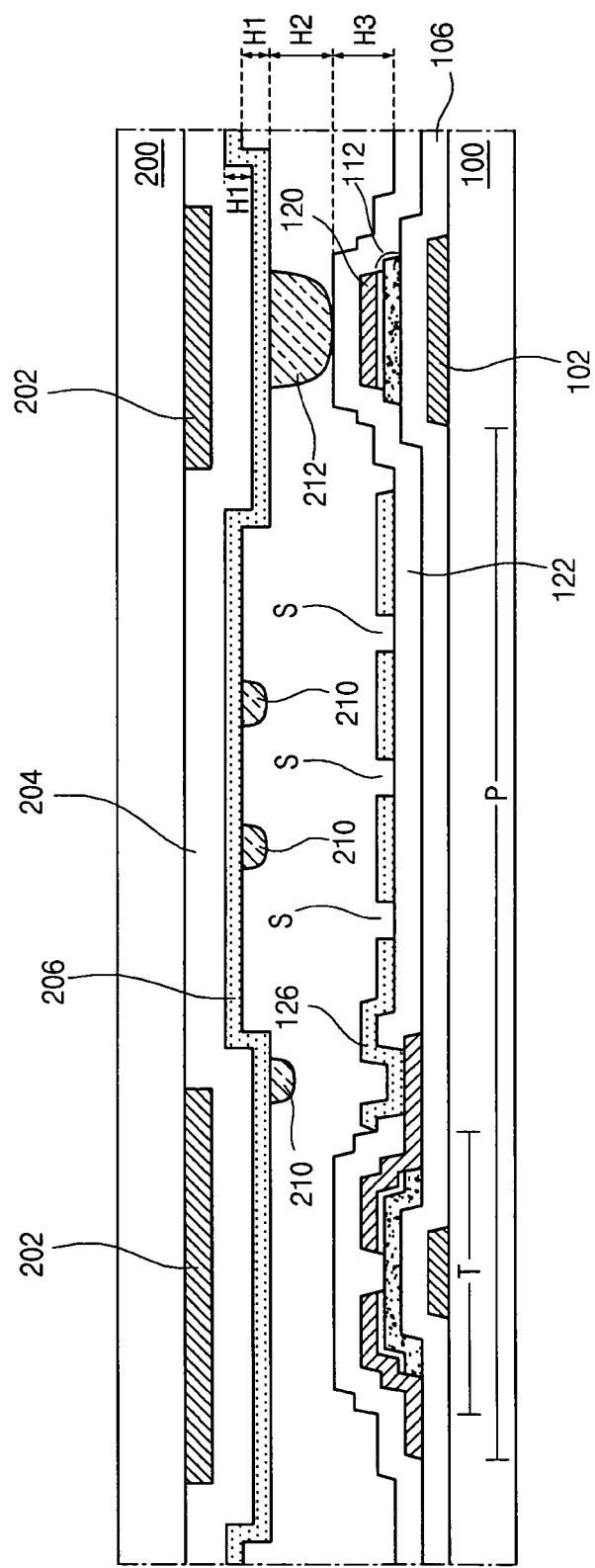
FIG. 6 is a cross-sectional view illustrating a pixel region of a VA mode LCD device according to an embodiment of the present invention.

FIG. 6 is a cross-sectional view illustrating a pixel region of a VA mode LCD device according to an embodiment of the present invention and corresponds to line VI-VI of FIG. 5.

As shown in FIG. 6, a pixel region P is defined on a first substrate 100, and a thin film transistor T is formed at one side of the pixel region P on the first substrate 100. A gate line 102 is formed on the first substrate 100, and a data line (not shown) is formed over the first substrate 100. The data line crosses the gate line 102 to define the pixel region P. A semiconductor pattern 112 and a metal pattern 120 having an island shape are sequentially formed over the gate line 102. A passivation layer 122 covers the thin film transistor T, the semiconductor pattern 112 and the metal pattern 120. A pixel electrode 126 is formed in the pixel region P on the passivation layer 122 and is connected to the thin film transistor T. The pixel electrode 126 includes a plurality of slits S.

A second substrate 200 is spaced apart from and faces the first substrate 100. A black matrix 202 is formed on an inner surface of the second substrate 200 and corresponds to a border portion between adjacent pixel regions P. The black matrix 202 also covers the thin film transistor T. A color filter layer 204 is formed on the second substrate 200 including the black matrix 202. The color filter layer 204 includes red, green and blue color filters sequentially arranged, and each color filter corresponds to the pixel region P. The color filter layer 204 covers the black matrix 202. A common electrode 206 is formed on the color filter layer 204. The common electrode 206 is formed of a transparent conductive material.

Ribs 210 are formed on the common electrode 206 in the pixel region P. Each rib 210 corresponds to a portion of the common electrode 206 between adjacent slits S. A spacer 212 is formed on the common electrode 206 corresponding to the semiconductor pattern 112 and the metal pattern 120. Thus, the spacer 212 contacts the passivation layer 122, which is on the metal pattern 120.

The passivation layer 122 has a step due to the metal pattern 120 and the semiconductor pattern 112. The color filter layer 204 also has a step due to the black matrix 202. The step height H1 of the color filter layer 204 may be within a range of about 0.7 μm to about 0.9 μm. The spacer 212 can have a height H2 within a range of about 1.9 μm to about 2.1 μm. A step height H3 of the passivation layer 122 can be within a range of about 0.6 μm to about 0.8 μm.

The sum of the step height H1 of the color filter layer 204, the height H2 of the spacer 212, and the step height H3 of the passivation layer 122 is substantially equal to a cell gap between the first and second substrates 100 and 200. A manufacturing method of a VA mode LCD device according to an embodiment of the present invention will be explained hereinafter with reference to FIGS. 7A to 7D.

Figure 7A:
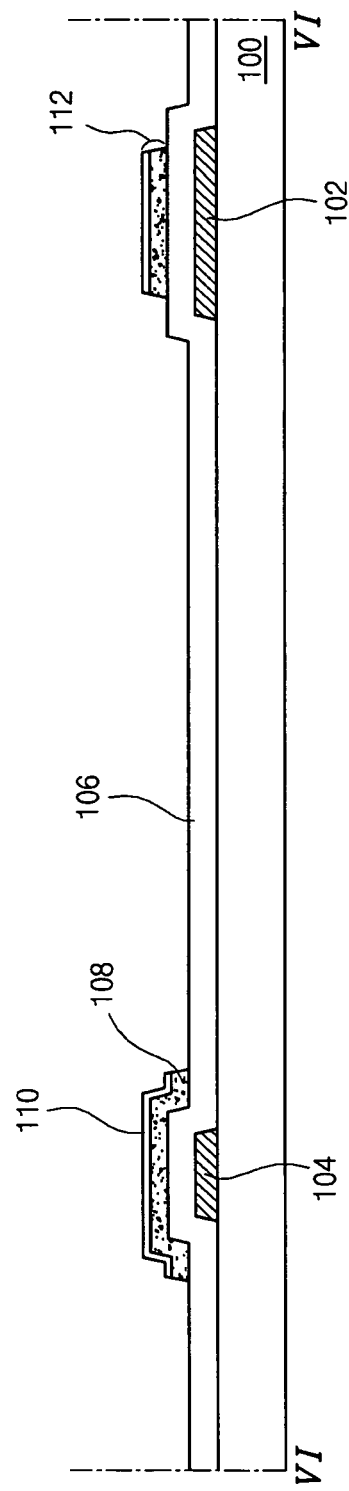

FIGS. 7A to 7D illustrate a manufacturing method of an array substrate for a VA mode LCD device according to an embodiment of the present invention and are cross-sections corresponding to the line similar to VI-VI of FIG. 5. As shown in FIG. 7A, a gate line 102 and a gate electrode 104 are formed on a substrate 100 by depositing one or more metallic materials and then patterning the one or more metallic materials. The one or more metallic materials may include aluminum (Al) and an aluminum alloy such as AlNd, chromium (Cr), copper (Cu), titanium (Ti), molybdenum (Mo), and tungsten (W). The gate electrode 104 can be a part of the gate line 102 or may extend from the gate line 102.

Subsequently, a gate insulating layer 106 is formed across a surface of the substrate 100, including the gate line 102 and the gate electrode 104, by depositing one or more inorganic insulating materials from a group including silicon nitride ($SiN_x$) and silicon oxide ($SiO_2$). Next, an active layer 108 and an ohmic contact layer 110 are formed on the gate insulating layer 106 over the gate electrode 104 by sequentially depositing and then patterning intrinsic amorphous silicon (a-Si:H) and impurity-doped amorphous silicon, such as $n^+$ or $p^+$ a-Si:H. At the same time, a semiconductor pattern 112 having an island shape is formed on the gate insulating layer 106 over the gate line 102. The ohmic contact layer 110 may be formed by doping impurities into an amorphous silicon layer.

As shown in FIG. 7B, a source electrode 116 and a drain electrode 118 are formed on the ohmic contact layer 110 by depositing one or more metallic materials selected from the above-stated metallic material group across a surface of the substrate 100, including the active layer 108 and the ohmic contact layer 110, and then patterning the one or more metallic materials. Simultaneously, a data line (not shown) and a metal pattern 120 are formed. The data line is connected to the source electrode 116, and the metal pattern 120 is disposed on the semiconductor pattern 112. Then, a portion of the ohmic contact layer 110 exposed between the source and drain electrodes 116 and 118 is removed, thereby exposing the active layer 108. The gate electrode 104, the active layer 108, the ohmic contact layer 110, and the source and drain electrodes 116 and 118 constitute a thin film transistor.

As shown in FIG. 7C, a passivation layer 122 is formed across a surface of the substrate 100, including the source and drain electrodes 116 and 118 and the metal pattern 120, by depositing one or more inorganic insulating materials from a group including silicon nitride ($SiN_x$) and silicon oxide ($SiO_2$). The passivation layer 122 can be formed by coating one or more organic insulating materials from a group including benzocyclobutene (BCB) and acrylic resin. The passivation layer 122 has a step due to the metal pattern 120 and the semiconductor pattern 112. The step of the passivation layer 122 has a height H3 within a range of about 0.6 pin to about 0.8 μm. Then, the passivation layer 122 is patterned to form a drain contact hole 124, which exposes a part of the drain electrode 116.

Figure 7D:
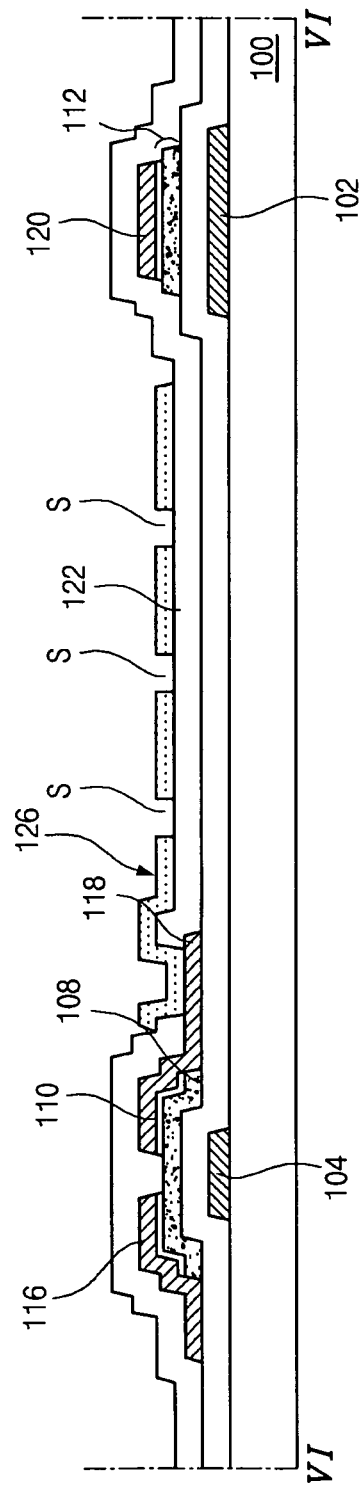

As shown in FIG. 7D, a pixel electrode 126 is formed on the passivation layer 122 by depositing a transparent conductive material from a group including indium tin oxide (ITO) and indium zinc oxide (IZO) and then patterning the transparent conductive material. The pixel electrode 126 is connected to the drain electrode 118 through the drain contact hole 124. The pixel electrode 126 has a plurality of slits S. The slits S are separate from the gate line 102 and have a symmetrical pattern. As stated above, the slits S in the pixel region P appear to substantially form portions of the pixel electrode into "V-shapes" that are left-handedly rotated by a right angle with respect to the gate line 102, and thus multi-domains are formed in one pixel region. In the array substrate of embodiments in the present invention, the pixel electrode 126 has the slits S, and the passivation layer 122 over the gate line 102 has a step due to the combined thicknesses of the metal pattern 120 and the semiconductor pattern 112.

Figure 8A:
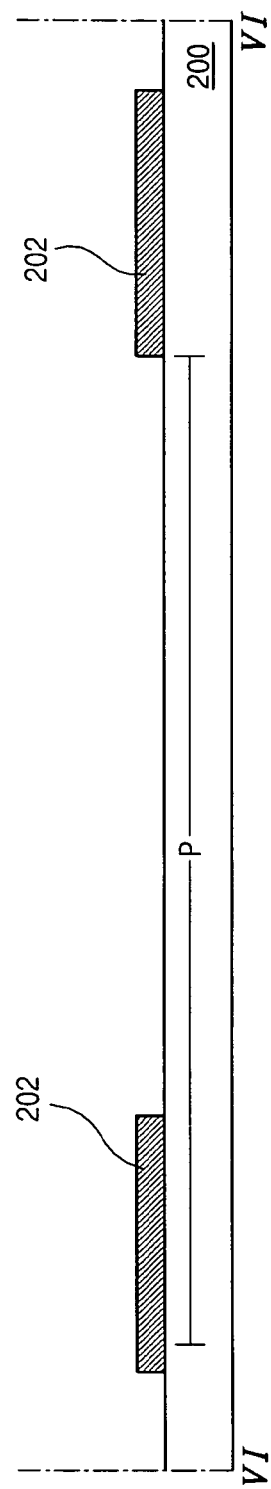

FIGS. 8A to 8F illustrate a manufacturing method of a color filter substrate for a VA mode LCD device according to an embodiment of the present invention and are cross-sections corresponding to the line similar to VI-VI of FIG. 5. As shown in FIG. 8A, a black matrix 202 is formed on a transparent substrate 200, on which a pixel region P is defined, by coating a black resin and patterning the black resin through a first mask process. The black matrix 202 corresponds to a border portion between adjacent pixel regions P. The black matrix 202 also covers the thin film transistor. The black matrix 202 has a thickness within a range about 1.3 μm to about 1.4 μm.

Figure 8B:
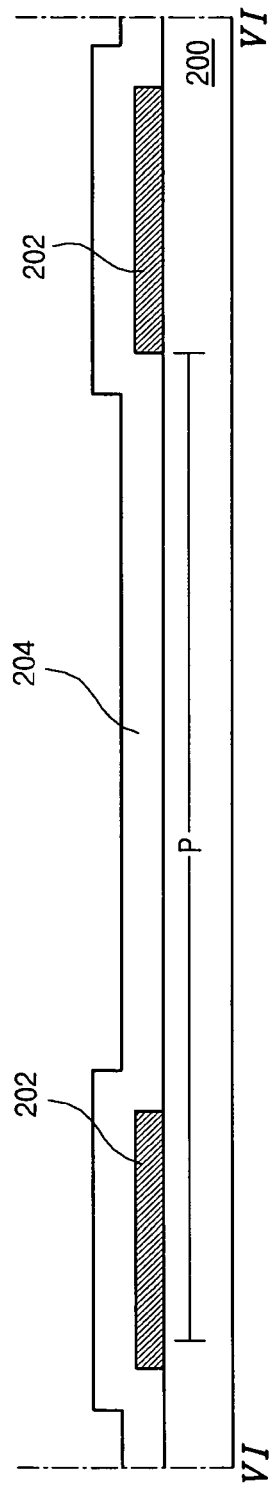

As shown in FIG. 8B, a color filter layer 204 is formed on the substrate 200 including the black matrix 202. The color filter layer 204 includes three color filters of red, green and blue. Each color filter may be formed by coating pigment resin including color pigments on across a surface of the substrate 200 and then patterning the pigment resin in a mask process. Thus, to form the red, green and blue color filters, three mask processes, that is, second, third and fourth mask processes are performed. Here, the color filter layer 204 may have a stripe structure, where color filters of the same color are formed in adjacent pixel regions along a direction parallel to the data line.

Figure 8C:
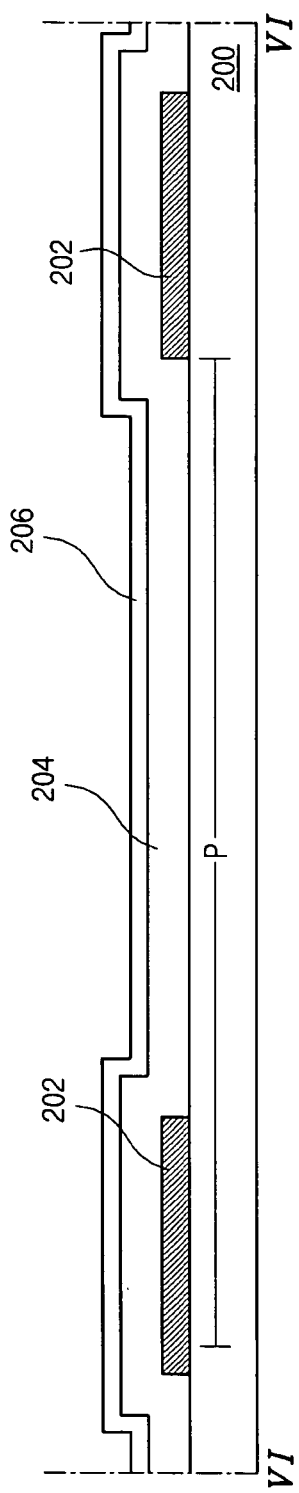
Figure 8F:
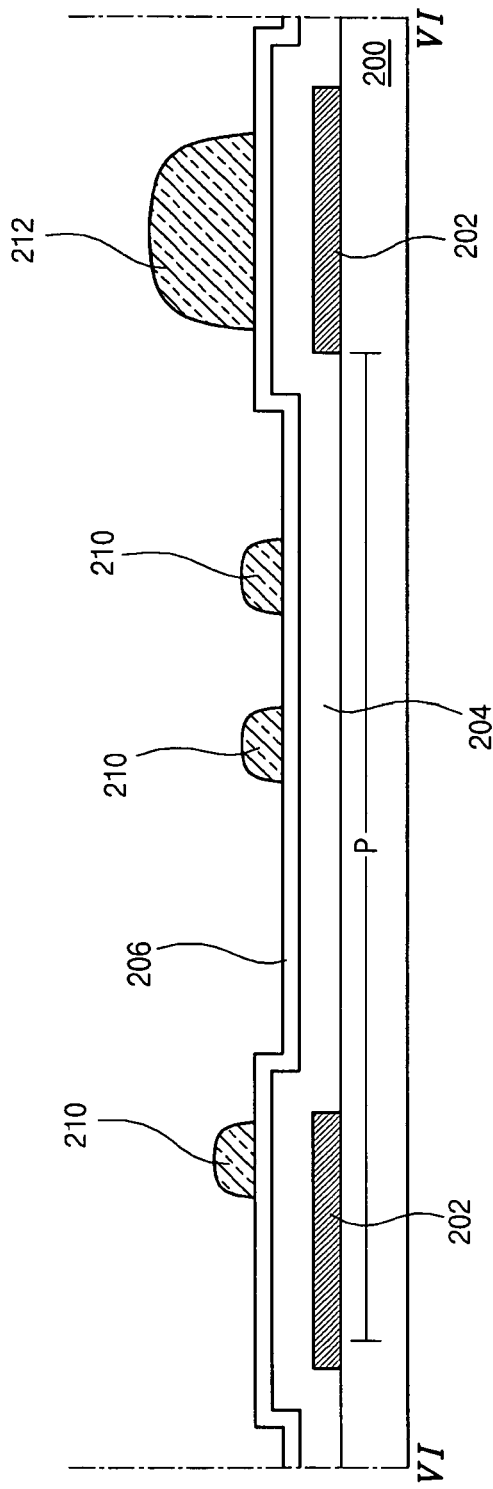

As shown in FIG. 8C, a common electrode 206 is formed across a surface of the substrate 200, including the color filter layer 204, by depositing a transparent conductive material selected from a group including indium tin oxide (ITO) and indium zinc oxide (IZO). Next, as shown in FIGS. 8D to 8F, ribs and a spacer are formed through a fifth mask process. More particularly, as shown in FIG. 8D, a photosensitive layer 208 is formed across a surface of the substrate 200, including the common electrode 206, by coating a photosensitive resin. A mask M, including a transmitting portion F1 and a blocking portion F2, is disposed over the photosensitive layer 208. The blocking portion F2 has first parts corresponding to the pixel region P and a second part corresponding to the black matrix 202. The first parts have a first width W1, and the second part has a second width W2 that is wider than the first width W1. For example, the first width W1 can be within a range of about 10 μm to about 11 μm, and the second width W2 can be within a range of about 20 μm to about 30 μm. Next, the photosensitive layer 208 is exposed to light through the mask M and then the photosensitive layer 208 is developed.

As shown in FIG. 8E, first patterns 210 and a second pattern 212 are formed on the common electrode 206. The second pattern 212 has a width wider than the first patterns 210. The first patterns 210 are formed in the pixel region P and are disposed between adjacent slits S, as shown in FIG. 5. Therefore, the first patterns 210 correspond to the "V-shapes" of the pixel electrode. The second pattern 212 is formed over the black matrix 202 and corresponds to the gate line 102, as shown in FIG. 5.

The substrate 200, including the first patterns 210 and the second pattern 212, is heat-treated. As a result, the first patterns 210 and the second pattern 212 shrink, and heights of the first patterns 210 and the second pattern 212 are reduced. The first patterns 210 shrink more than the second pattern 212. When a pattern has a width of about 10 μm to about 11 μm, the pattern has a height of about 1.3 μm to about 1.5 μm after a heat-treatment process, and when a pattern has a width of about 20 μm to about 30 μm, the pattern has a height of about 2.0 μm to about 2.2 μm after the heat-treatment process. Therefore, by using different shrink rates according to widths, patterns having different heights are formed using the same process. The first patterns 210 function as ribs for dividing the pixel region P into multi-domains, and the second pattern 212 acts as a spacer for maintaining a cell gap between two substrates.

In embodiments of the present invention, since the ribs and the spacer are formed through the same process, the color filter substrate can be formed through a five mask process. The array substrate fabricated in FIGS. 7A to 7D and the color filter substrate fabricated in FIGS. 8A to 8F are attached with a liquid crystal material therebetween, thereby further manufacturing an LCD device.

Figure 9A:
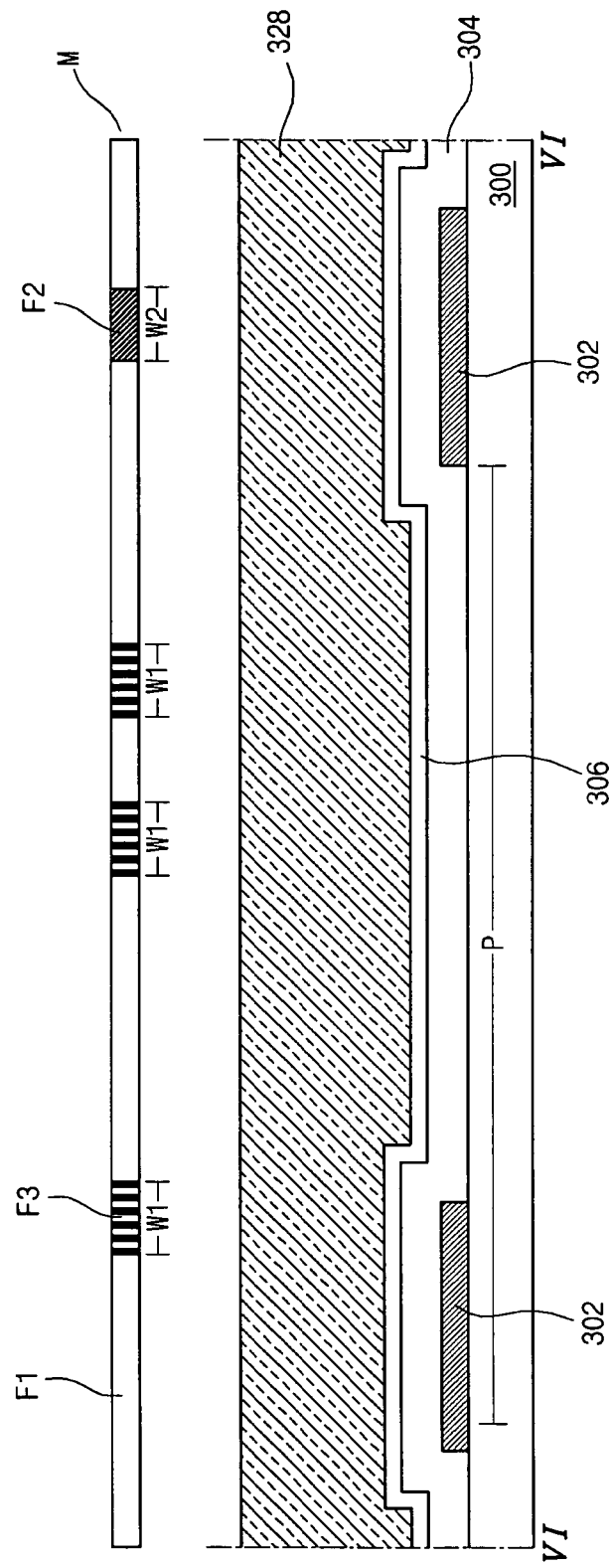
FIGS. 9A to 9C are cross-sectional views illustrating a manufacturing method of a color filter substrate for a VA mode LCD device according to another embodiment of the present invention.
Figure 9B:
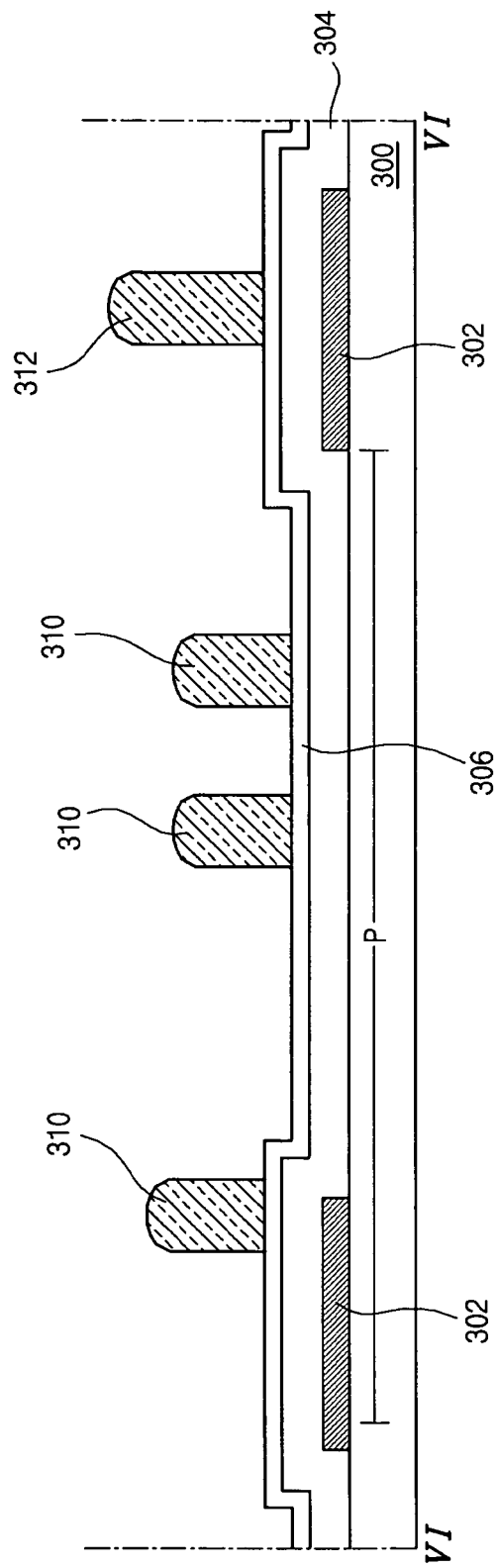
Figure 9C:
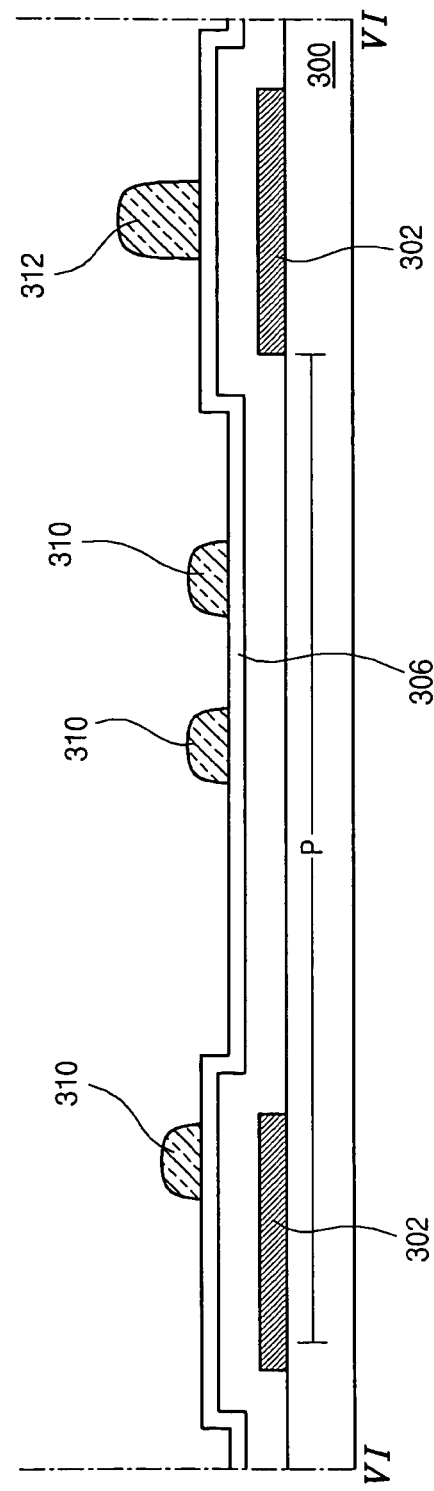

FIGS. 9A to 9C illustrate a manufacturing method of a color filter substrate for a VA mode LCD device according to another embodiment of the present invention and are cross-sections corresponding to a line similar to VI-VI of FIG. 5. As shown in FIG. 9A, a black matrix 302, a color filter layer 304, and a common electrode 306 are sequentially formed on a substrate 300, on which a pixel region P is defined. The black matrix 302, the color filter layer 304, and the common electrode 306 can be formed through the same processes as the embodiment shown in FIGS. 8A to 8C.

Next, a photosensitive layer 308 is formed on the common electrode 306 by coating photosensitive resin on across surface of the substrate 300, including the common electrode 306. A mask M, including transmitting portion F1, a blocking portion F2 and a half-transmitting portion F3 is disposed over the photosensitive layer 308. The blocking portion F2 corresponds to the black matrix 302. The half-transmitting portion F3 corresponds to the pixel region P and includes a plurality of parts. Each part of the half-transmitting portion F3 has a first width W1, and the blocking portion F2 has a second width W2, which is equal to the first width W1. The half-transmitting portion F3 may include a plurality of slits or may include a semitransparent layer. The slits lower the strength of light, and the semitransparent layer reduces the intensity of radiation. Therefore, the photosensitive layer 308 corresponding to the half-transmitting portion F3 is partially exposed. Subsequently, the photosensitive layer 308 is exposed to light through the mask M and then the photosensitive layer 308 is developed.

As shown in FIG. 9B, first patterns 310 and a second pattern 312 are formed on the common electrode 306. The first patterns 310 correspond to the half-transmitting portion F3, and the second pattern 312 corresponds to the blocking portion F2. Thus, the second pattern 312 is higher than the first patterns 310. The second pattern 312 can have the same thickness as the photosensitive layer 308 of FIG. 9A. The first patterns 310 are formed in the pixel region P and are disposed between adjacent slits S of FIG. 5. Therefore, the first patterns 310 correspond to the "V-shapes" of the pixel electrode. The second pattern 312 is formed over the black matrix 302 and corresponds to the gate line 102 of FIG. 5.

The substrate 300, including the first patterns 310 and the second pattern 312, is heat-treated. As a result, the first patterns 310 and the second pattern 312 shrink such that the heights of the first patterns 310 and the second pattern 312 are reduced. In this instance, the first patterns 310 and the second pattern 312 shrink at the same rate. As shown in FIG. 9C, the first patterns 310, which function as ribs, are formed in the pixel region P, and the second pattern 312, which is higher than the first patterns 310, acts as a spacer and is formed over the black matrix 302.

In embodiments of the present invention, the ribs and the spacer are simultaneously formed on the common electrode, and thus the manufacturing process is simplified. Moreover, since additional steps are not needed under the common electrode corresponding to the spacer, the common electrode is prevented from being disconnected, and a high quality LCD device is manufactured. Further, by forming multi-domains having symmetrical properties within liquid crystal arrangement, an LCD device having a wide viewing angle is manufactured.

It will be apparent to those skilled in the art that various modifications and variations can be made in the vertical alignment mode liquid crystal display device and the method of fabricating a liquid crystal display device of the present invention without departing from the spirit or scope of the inventions. Thus, it is intended that the present invention covers the modifications and variations of this invention provided they come within the scope of the appended claims and their equivalents.

What is claimed is:

1. A method of manufacturing a color filter substrate for a liquid crystal display device, comprising:
   forming a black matrix on a substrate including a pixel region, the black matrix corresponding to a border portion between adjacent pixel regions;
   forming a color filter layer on the black matrix;
   forming a common electrode on the color filter layer;
   forming a photosensitive layer on the common electrode;
   exposing the photosensitive layer to light through a mask, the mask including a transmitting portion and a blocking portion;
   forming first patterns and a second pattern by developing the exposed photosensitive layer, the first patterns corresponding to the pixel region, and the second pattern corresponding to the black matrix, wherein the second pattern is wider than the first patterns; and forming ribs and a spacer by heat-treating the first patterns and the second pattern, wherein the spacer has a higher height than the ribs, wherein the color filter layer has a step due to the black matrix, and wherein the step has a height within a range of about 0.8 μm to about 0.9 μm.

2. The method according to claim 1, wherein the blocking portion includes first parts each having a first width corresponding to the pixel region and a second part having a second width corresponding to the black matrix, wherein the second width is wider than the first width.

3. The method according to claim 1, wherein the ribs correspond to portions of a pixel electrode having "V-shapes".

4. The method according to claim 1, wherein the spacer has a height within a range of about 1.9 μm to about 2.1 μm.

5. The method according to claim 1, wherein forming the black matrix includes coating and then patterning a black resin.

6. The method according to claim 1, wherein the color filter layer includes red, green and blue color filters, wherein each color filter corresponds to the pixel region, and the color filters in adjacent pixel regions with the spacer therebetween have the same color as each other.

7. A method of manufacturing a color filter substrate for a liquid crystal display device, comprising:

forming a black matrix on a substrate including a pixel region, the black matrix corresponding to a border portion between adjacent pixel regions;

forming a color filter layer on the black matrix;

forming a common electrode on the color filter layer;

forming a photosensitive layer on the common electrode;

exposing the photosensitive layer to light through a mask, the mask including a transmitting portion, a blocking portion, and a half-transmitting portion;

forming first patterns and a second pattern by developing the exposed photosensitive layer, the first patterns corresponding to the pixel region, and the second pattern corresponding to the black matrix; and forming ribs and a spacer by heat-treating the first patterns and the second pattern, wherein the spacer has a higher height than the ribs, and wherein each first pattern has the same width as the second pattern.

8. The method according to claim 7, wherein the half-transmitting portion corresponds to the pixel region, and the blocking portion corresponds to the black matrix.

9. The method according to claim 7, wherein the half-transmitting portion includes a plurality of parts, and each part of the half-transmitting portion has the same width as the blocking portion.

* * * * *